(12) United States Patent
Abe

(10) Patent No.: US 8,950,451 B2
(45) Date of Patent: Feb. 10, 2015

(54) NON-PNEUMATIC TIRE

(75) Inventor: Akihiko Abe, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 945 days.

(21) Appl. No.: 13/002,930

(22) PCT Filed: Jul. 9, 2009

(86) PCT No.: PCT/JP2009/062536
§ 371 (c)(1),
(2), (4) Date: Jan. 6, 2011

(87) PCT Pub. No.: WO2010/005056
PCT Pub. Date: Jan. 14, 2010

(65) Prior Publication Data
US 2011/0108173 A1    May 12, 2011

(30) Foreign Application Priority Data

Jul. 9, 2008    (JP) .................................. 2008-178656
Apr. 21, 2009   (JP) .................................. 2009-102981

(51) Int. Cl.
| | | |
|---|---|---|
| *B60B 9/04*   | (2006.01) |
| *B60C 7/18*   | (2006.01) |
| *B60C 7/22*   | (2006.01) |
| *B60C 11/04*  | (2006.01) |

(52) U.S. Cl.
CPC ... *B60B 9/04* (2013.01); *B60C 7/18* (2013.01); *B60C 7/22* (2013.01); *B60C 11/04* (2013.01)
USPC .................. 152/80; 152/12; 152/69; 152/84; 152/86

(58) Field of Classification Search
USPC .............. 152/80, 81, 76, 5, 11, 12, 69, 84–86
See application file for complete search history.

(56) References Cited

U.S. PATENT DOCUMENTS

| | | | | |
|---|---|---|---|---|
| 1,021,440 A | * | 3/1912 | Hocokett ......................... | 152/84 |
| 1,146,654 A | * | 7/1915 | Rietschel ......................... | 152/11 |
| 1,289,517 A | * | 12/1918 | Musselman ..................... | 152/80 |

(Continued)

FOREIGN PATENT DOCUMENTS

| | | |
|---|---|---|
| DE | 247843 | 6/1912 |
| GB | 1176   | 0/1910 |

(Continued)

OTHER PUBLICATIONS

International Search Report of PCT/JP2009/062536 dated Sep. 15, 2009.

(Continued)

*Primary Examiner* — Gregory Blankenship
(74) *Attorney, Agent, or Firm* — Sughrue Mion, PLLC

(57) ABSTRACT

In a non-pneumatic tire (1), a plurality of connecting members (13) that connects a mounting body (11) and an annular body (12) are provided along a tire-circumferential direction. The annular body is split into a plurality of split bodies (12a) along the tire-circumferential direction. A resilient member (16) that is extended along the tire-circumferential direction and connects the plurality of split bodies in the tire-circumferential direction is provided in the annular body. This non-pneumatic tire (1) secures satisfactory ride quality, maneuverability and durability by suppressing increase in weight, hardness and rolling resistance, ensures uniform contact-pressure distribution, and prevents the occurrence of a puncture.

9 Claims, 11 Drawing Sheets

(56) References Cited

U.S. PATENT DOCUMENTS

| | | | | |
|---|---|---|---|---|
| 1,309,839 | A * | 7/1919 | Bowman | 152/84 |
| 1,451,827 | A * | 4/1923 | Hobson | 152/75 |
| 1,462,865 | A * | 7/1923 | Lieckfelt | 152/80 |
| 1,636,310 | A * | 7/1927 | Ludlow | 152/76 |
| 6,170,544 | B1 * | 1/2001 | Hottebart | 152/11 |
| 8,091,596 | B2 * | 1/2012 | Louden | 152/5 |
| 8,783,310 | B2 * | 7/2014 | Abe | 152/84 |
| 2002/0096237 | A1 * | 7/2002 | Burhoe et al. | 152/11 |
| 2010/0218869 | A1 * | 9/2010 | Abe | 152/246 |
| 2011/0108173 | A1 * | 5/2011 | Abe | 152/76 |

FOREIGN PATENT DOCUMENTS

| | | |
|---|---|---|
| GB | 156482 | 7/1921 |
| JP | 22020 B | 4/1912 |
| JP | 43543 B | 9/1922 |
| JP | 06-293203 A | 10/1994 |
| WO | 2006/116807 A1 | 11/2006 |

OTHER PUBLICATIONS

European Search Report issued in European Application No. 09794500.0, dated Aug. 18, 2011.

Japanese Office Action, dated Aug. 6, 2013, issued in corresponding Japanese Patent Application No. 2009-102981.

* cited by examiner

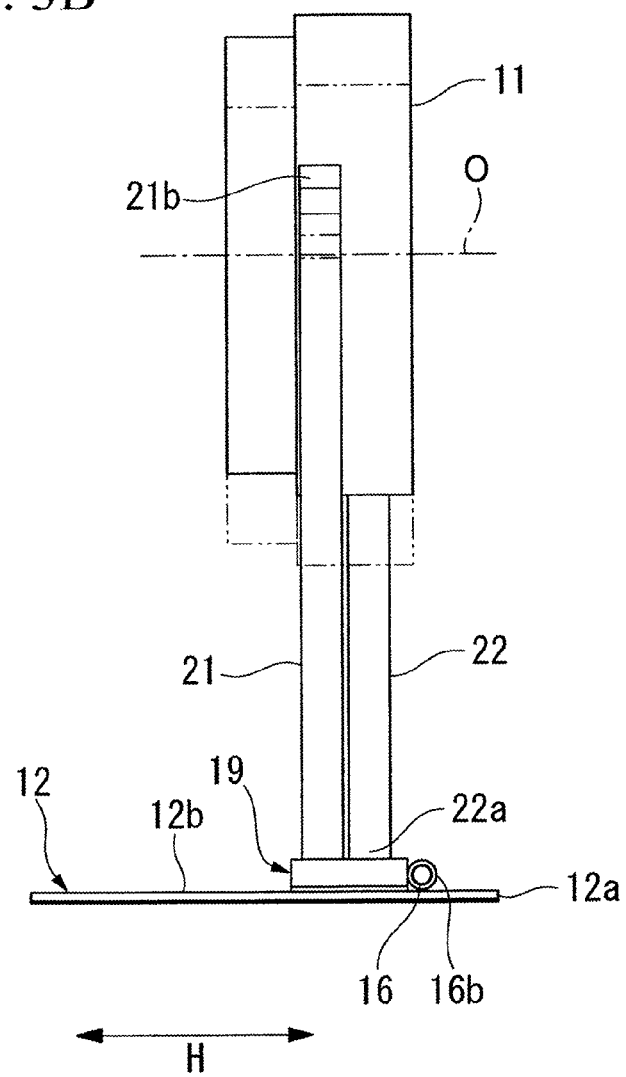

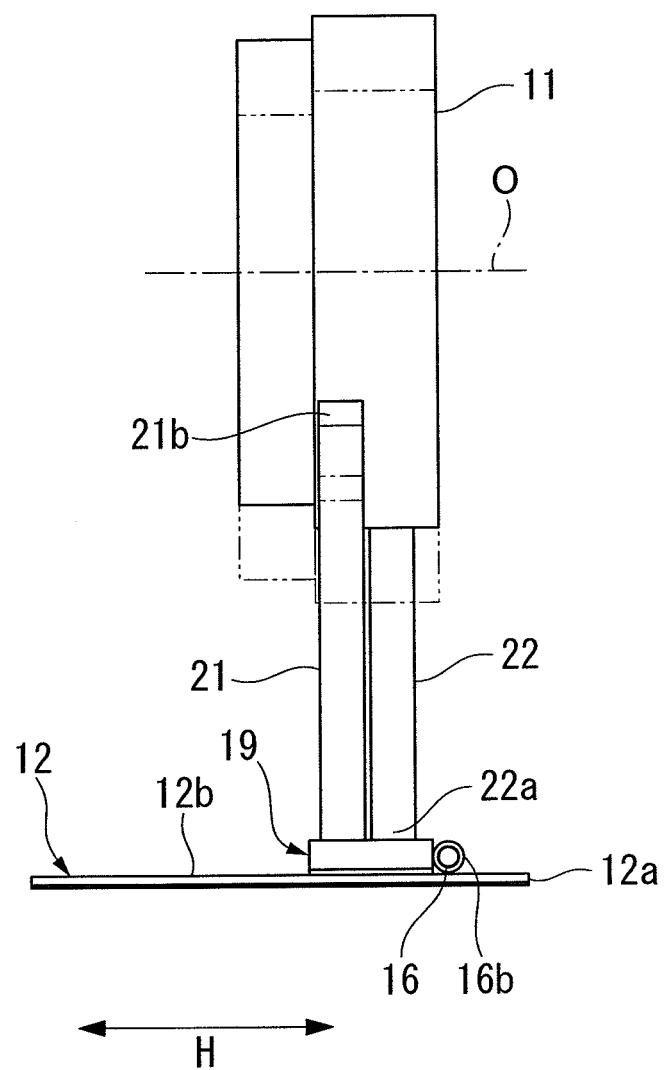

NON-PNEUMATIC TIRE

TECHNICAL FIELD

The present invention relates to a non-pneumatic tire which does not require filling its inside with pressurized air when used.

This application claims the benefit of Japanese Patent Application 2008-178656 filed in Japan on Jul. 9, 2008 and Japanese Patent Application 2009-102981 filed in Japan on Apr. 21, 2009, the entire disclosure of which is incorporated by reference herein.

BACKGROUND ART

In a known pneumatic tire that is filled with pressurized air, the possibility of a puncture is an inevitable structural problem.

A conventional non-pneumatic tire capable of preventing the occurrence of a puncture includes a so-called solid tire that has a solid structure that is filled therein with a rubber material as described for example in Patent Literature 1.

CITATION LIST

Patent Literature

[Patent Literature 1] Japanese Patent Application, First Publication No. H06-293203

DISCLOSURE OF THE PRESENT INVENTION

Problem to be Solved by the Present Invention

However, the conventional non-pneumatic tire has heavy weight, high hardness and high rolling resistance as compared with a pneumatic tire. Accordingly, ride quality and maneuverability drastically deteriorate. Therefore there is a limit to the application range thereof due to difficulties about the application to general vehicles.

The present invention has been made in consideration of such circumstances and an object of the present invention is to provide a non-pneumatic tire capable of securing satisfactory ride quality, maneuverability and durability by suppressing increase in weight, hardness and rolling resistance, ensuring uniform contact-pressure distribution, and preventing the occurrence of a puncture.

Means for Solving the Problem

To solve the problems and to achieve such object, according to the present invention, there is provided a non-pneumatic tire including a mounting body that is mounted on an axle, an annular body that encircles the mounting body from the outside in a tire-radial direction, and a plurality of connecting members that is disposed along a tire-circumferential direction and connects the mounting body and the annular body. In a side view of the tire in a direction of the axial line, the connecting member has first connecting plate curved to protrude toward a first side in the tire-circumferential direction and second connecting plate curved to protrude toward a second side. Furthermore the annular body is split into a plurality of split bodies along the tire-circumferential direction, and a resilient member that is extended along the tire-circumferential direction is provided in the annular body and connects the plurality of split bodies in the tire-circumferential direction.

In the present invention, the non-pneumatic tire is configured by connecting the mounting body and the annular body with the plurality of connecting members that is disposed along the tire-circumferential direction, and does not have a solid structure in which the inner portion is filled with a rubber material. Consequently, satisfactory ride quality and maneuverability can be secured by suppressing increase in weight, hardness and rolling resistance, and the occurrence of a puncture can be prevented.

Since the connecting member in a side view of the tire includes first connection plate curved to protrude toward a first side in the tire-circumferential direction and second connecting plate curved to protrude toward a second side, when the mounting body and the annular body undergo relative displacement in the tire-radial direction, the tire-circumferential direction or the tire-widthwise direction by an external force applied on the non-pneumatic tire, the first connecting plate and the second connecting plate can be easily and resiliently deformed in response to the displacement. As a result, flexibility can be imparted to the non-pneumatic tire, and satisfactory ride quality can be certainly secured by suppressing the transmission of vibrations to the vehicle.

Since the annular body is split into the plurality of split bodies along a tire-circumferential direction, the flexibility of the annular body is enhanced. Thus the annular body as well as the first connecting plate and the second connecting plate can be easily deformed in response to an external force applied to the non-pneumatic tire. Therefore, a difference in contact pressure within the contact surface of the tire to the ground can be suppressed, satisfactory ride quality can be further reliably secured, and durability can be improved when a tread member is provided on the outer circumferential side of the annular body as described below.

Since the annular body above is split into the plurality of split bodies along the tire-circumferential direction, the formation of the non-pneumatic tire is facilitated. Moreover, for example, when a part of the annular body is damaged, only the damaged part can be exchanged without exchanging all of the annular body, and thereby maintenance characteristic can be improved.

Furthermore since a resilient member that is extended along the tire-circumferential direction is provided in the annular body and connects the plurality of split bodies in the tire-circumferential direction, the amount of deformation of the annular body can be regulated. As a result, an excessive increase in the flexibility of the annular body by dividing the annular body into the plurality of split bodies can be suppressed.

Therefore a difference in contact pressure within the contact surface of the tire to the ground can be suppressed, and production of vibrations can be suppressed. Moreover since the annular body is split into the plurality of split bodies, an increase in rolling resistance of the non-pneumatic tire or an increase in the load applied to both connecting plates can be suppressed.

Of the above effects, since an increase in the load applied to both connecting plates can be suppressed, there is no requirement to increase durability of both connecting plates by increasing the bending rigidity so as to split the annular body into the plurality of split bodies. As a result, an increase in the weight of the connecting plate can be suppressed. Thus, an increase in the weight of the non-pneumatic tire by dividing the annular body into the plurality of split bodies can be prevented.

Furthermore since the plurality of split bodies is connected in a tire-circumferential direction by the resilient member and not by a rigid body, it is possible to prevent a large reduction in the contact surface area. In addition, since the load from the road surface is dispersed to wide area of the non-pneumatic tire through the resilient members, the formation of a section to which large localized load is applied on the tire can be prevented, and the durability of the tire can be improved.

When each connecting member displays line symmetry about an imaginary line extending in the tire-radial direction in the side view of the tire, the difference between the spring constant along the first side and the spring constant along the second side in the tire-circumferential direction in the non-pneumatic tire can be suppressed. Therefore, since the difference between the spring constant in the direction of travel and the spring constant in the braking direction in the contact section of the non-pneumatic tire can be suppressed when tire is contacted to the ground, satisfactory maneuverability can be ensured.

A tread member may be installed along the whole circumference of the outer circumferential side of the annular body, a pattern groove may be formed on the outer circumferential surface of the tread member, and each first end of the first connecting plate and the second connecting plate may be connected to the position that corresponds to the pattern groove on the inner circumferential side of the annular body.

In this case, since the tread member is installed along the whole circumference of the outer circumferential side of the annular body, the riding quality, the gripping characteristic and the durability quality of the non-pneumatic tire can be certainly improved.

Since each first end of the first connecting plate and the second connecting plate is connected to the position that corresponds to the pattern groove on the inner circumferential side of the annular body, when the non-pneumatic tire is contacted to the ground, the load that is applied to the whole connecting member from the road surface, and the load that is applied to the portion corresponding to each first end of the first connecting plate and the second connecting plate in the tread member can be respectively suppressed.

Of the above effects, since the load that is applied to the corresponding portion of the tread member can be suppressed, a local increase in the contact pressure in the corresponding portion of the tread member can be prevented, and a difference in the ground contact pressure within the contact surface can be further suppressed.

Each first end of the first connecting plate and the second connecting plate in one connecting member may be respectively connected at mutually different positions in the tire-widthwise direction and at the same position in the tire-circumferential direction on the inner circumferential side of the annular body. The plurality of connecting members may be disposed along the tire-circumferential direction so that a plurality of first connecting plates is disposed along the tire-circumferential direction at a first position in the tire-widthwise direction, and so that a plurality of second connecting plates is disposed along the tire-circumferential direction at a second position in the tire-widthwise direction.

In this case, each first end of both connecting plates in one connecting member is respectively connected at mutually different positions in a tire-widthwise direction and at the same position in the tire-circumferential direction on the inner circumferential side of the annular body. The plurality of connecting members is disposed along the tire-circumferential direction so that the plurality of first connecting plates is disposed along the tire-circumferential direction at a first position in the tire-widthwise direction, and so that the plurality of second connecting plates is disposed along the tire-circumferential direction at a second position in the tire-widthwise direction. Consequently the interference between adjacent connecting members along the tire-circumferential direction can be suppressed, and a limitation on the number of installed connecting members can be more effectively suppressed.

When the tread member is installed as described above, dispersion of the contact pressure acting on the tread member in the tire-widthwise direction is further promoted, and durability can be certainly improved.

The first connecting plate and the second connecting plate may be respectively formed by a metal material or a resin material.

In this case, the production of a hysteresis loss can be almost completely avoided, and rolling resistance can be reduced to less than a pneumatic tire.

At least one of each first end of the first connecting plate and the second connecting plate connected to the inner circumferential side of the annular body and each second end of the first connecting plate and the second connecting plate connected to the outer circumferential side of the mounting body may be supported to rotate freely about a rotation axial line that extends in parallel along the tire-widthwise direction.

In this case, since at least one of each first end and each second end of both connecting plates is supported to rotate freely about the rotation axial line that extends in parallel along the tire-widthwise direction, when the mounting body and the annular body are relatively displaced by an external force applied to the non-pneumatic tire as described above, since at least one of the ends rotates about the rotation axial line, it is possible to suppress a large localized deformation in at least one of the ends. Therefore, the load on at least one of the ends can be suppressed by uniformly deforming the whole of both connecting plates with little bias. Therefore, the riding quality, and the durability of the whole connecting member quality can be improved.

Each first end of the first connecting plate and the second connecting plate in one connecting member may be connected over a plurality of split bodies that is mutually adjacent along the tire-circumferential direction.

In this case, since each first end of the both connecting plates in one connecting member is connected over the plurality of split bodies that is mutually adjacent along the tire-circumferential direction, it is possible to easily secure the sufficient number of split bodies that configure the annular body so as to satisfy the above operation and effect. When the tread member is installed as described above, the contact pressure on the tread member can be easily dispersed in the tire-circumferential direction, and a difference in the contact pressure within the contact surface can be certainly suppressed.

Effects of the Present Invention

According to the present invention, satisfactory ride quality, maneuverability and durability can be secured by suppressing increase in weight, hardness and rolling resistance of the non-pneumatic tire, uniform contact-pressure distribution can be ensured, and the occurrence of a puncture can be prevented.

BRIEF DESCRIPTION OF THE DRAWINGS

FIG. 3B is a side view of the front view shown in FIG. 3A.

FIG. 8B is a side view of the front view shown in FIG. 8A.

BEST MODES FOR CARRYING OUT THE PRESENT INVENTION

Figure 1:
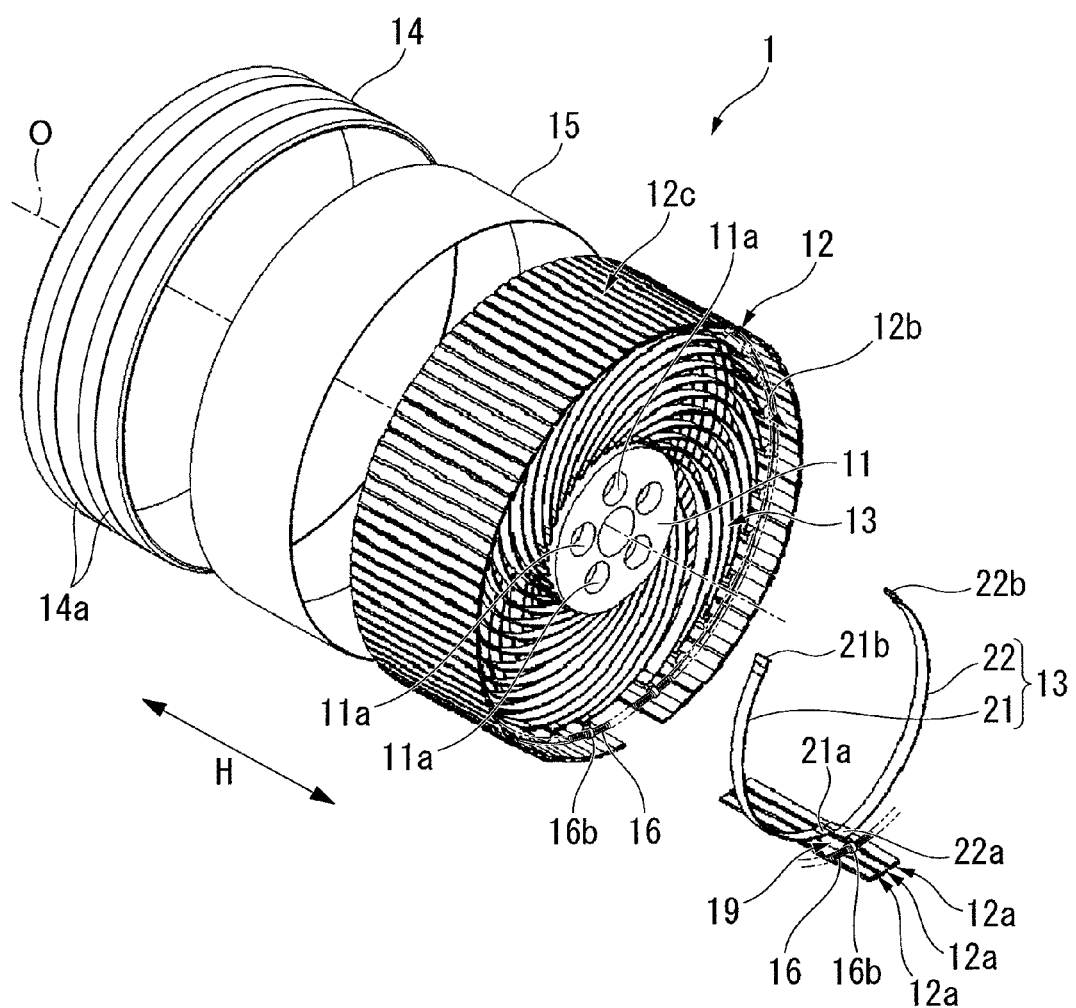
FIG. 1 is a schematic perspective view of disassembling a part of the non-pneumatic tire according to the first embodiment of the present invention.

A first embodiment of a non-pneumatic tire according to the present invention will be described hereafter making reference from FIG. 1 to FIG. 3B.

The non-pneumatic tire 1 is provided with an mounting body 11 mounted on an axle (not shown), an annular body 12 encircling the mounting body 11 from the outside in the tire-radial direction, a plurality of connecting members 13 that is disposed along the tire-circumferential direction and connects the outer circumferential face of the mounting body 11 and the inner circumferential face 12b of the annular body 12, a tread member 14 disposed over the entire outer circumferential face 12c of the annular body 12, and a reinforcing layer 15 disposed between the annular body 12 and the tread member 14.

The mounting body 11 has a circular shape in a side view of the non-pneumatic tire 1 from a direction of an axial line O, and a plurality of mounting holes 11a is formed at the radial center in the mounting body 11. For example, bolts are inserted into these mounting holes 11a, and are engaged to female screw portions formed in the axle, thereby the mounting body 11 is mounted on the axle. The mounting body 11 is a round disk and is formed of a metal material.

The tread member 14 has a cylindrical shape, and integrally covers the entire outer circumferential face 12c of the annular body 12. The thickness of the tread rubber 14 is, for example, about 10 mm. In the present embodiment, a plurality of circumferential main grooves (pattern grooves) 14a is formed on the outer circumferential surface of the tread member 14 with an interval in the tire-widthwise direction H. The tread member 14 is formed from vulcanized rubber prepared by vulcanizing natural rubber and/or a rubber composition, or a thermoplastic material or the like. The thermoplastic material includes a thermoplastic elastomer or a thermoplast resin or the like. The thermoplastic elastomer includes for example an amide thermoplastic elastomer (TPA), an ester thermoplastic elastomer (TPC), an olefin thermoplastic elastomer (TPO), a styrene thermoplastic elastomer (TPS), a urethane thermoplastic elastomer (TPU), a thermoplastic rubber cross-linked body (TPV), or other thermoplastic elastomers (TPZ), or the like in accordance with Japanese Industrial Standard K6418. The thermoplastic resin includes for example urethane resin, olefin resin, vinyl chloride resin, polyamide resin, or the like. In view of wear resistance properties, the tread member 14 is preferably formed from vulcanized rubber.

The reinforcing layer 15 is configured by arraying and embedding a plurality of steel cords in an inner portion of a rubber sheet that is formed like a cylinder. The reinforcing layer 15 may be integrally formed with the tread member 14. The reinforcing layer 15 is fixed by attaching its inner circumferential surface to the outer circumferential surface 12c of the annular body 12 and attaching its outer circumferential surface to the inner circumferential surface of the tread member 14, using an adhesive or the like.

In a side view of the tire, the connecting member 13 has a first connecting plate 21 curved to protrude toward a first side in the tire-circumferential direction and a second connecting plate 22 curved to protrude toward a second side. Each first end 21a, 22a of the first connecting plate 21 and the second connecting plate 22 in one connecting member 13 is respectively connected at the same position in the tire-circumferential direction on the inner circumferential surface 12b of the annular body 12. In the present embodiment, each of the first ends 21a, 22a is respectively connected at mutually different positions in a tire-widthwise direction H on the inner circumferential side 12b of the annular body 12.

Figure 3A:
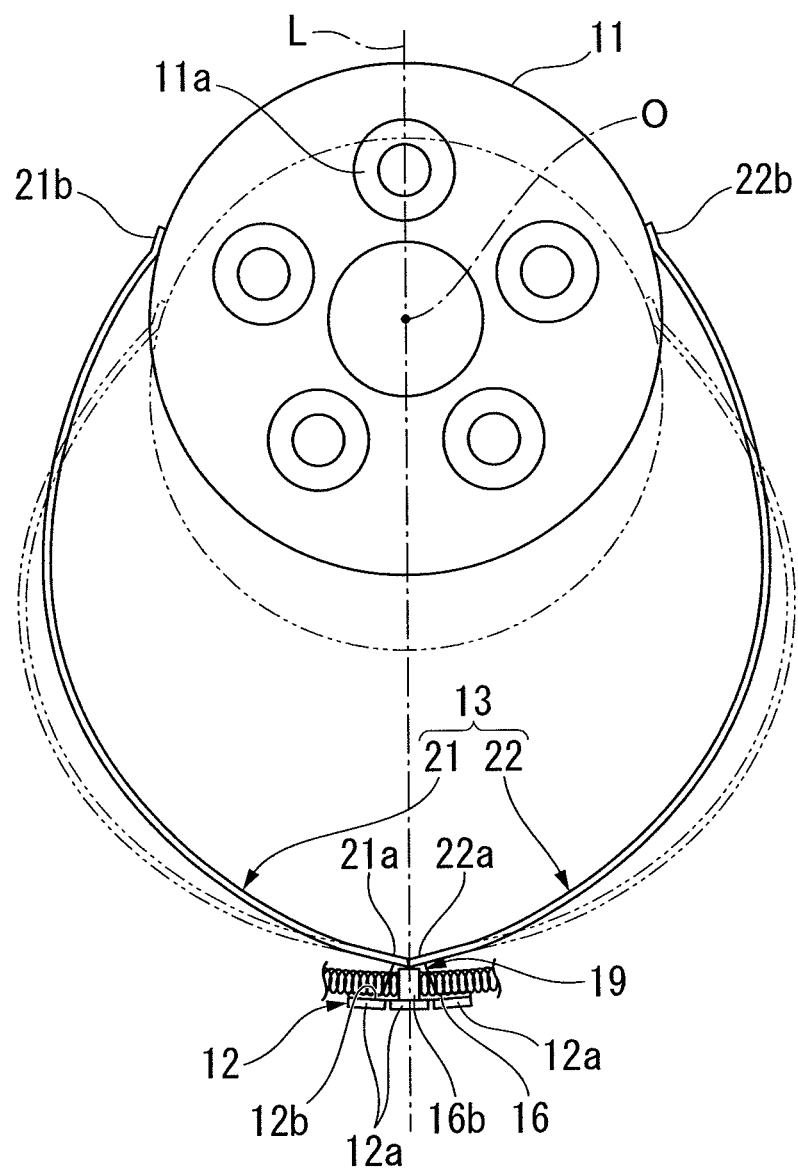
FIG. 3A is a front view of the connecting member and the mounting body seen from the tire-widthwise direction in the non-pneumatic tire in FIG. 1.

As shown in FIG. 3, the shape of each connecting member 13 in a side view of the tire displays line symmetry about an imaginary line L extending along the tire-radial direction through a central portion of connecting member 13 in the tire-circumferential direction. In the example shown in the figure, the imaginary line L passes through each first end 21a, 22a of both connecting plates 21, 22 and the axial line O.

In other words, both connecting plates 21, 22 are formed with equal length. In addition, in a side view of the tire, the second ends 21b, 22b of both connecting plates 21, 22 are respectively connected to positions separated by the same angle (for example, at least 45° to 135° or less, and preferably at least 90° to 120° or less) to the first side and the second side in the tire-circumferential direction about the axial line O from a position in the tire-radial direction facing each first end 21a, 22a on the outer circumferential surface of the mounting body 11.

The plurality of connecting members 13 is respectively disposed at positions displaying point symmetry with reference to the axial line O between the mounting body 11 and the annular body 12. Furthermore the plurality of connecting members 13 is disposed along the tire-circumferential direction (60 in the example shown in the figure) so that a plurality of first connecting plates 21 is disposed along the tire-circumferential direction at a first position in the tire-widthwise direction H, and so that a plurality of second connecting plates 22 is disposed along the tire-circumferential direction at a second position in the tire-widthwise direction H, that differs from the first position in the tire-widthwise direction H. All the connecting members 13 are formed with the same shape and size.

The first connecting plates 21 that are adjacently disposed along the tire-circumferential direction are substantially parallel, and face the tire-circumferential direction. The second connecting plates 22 that are adjacently disposed along the tire-circumferential direction are substantially parallel, and face the tire-circumferential direction. In the example shown in the figure, each second end 21b, 22b of both connecting plates 21, 22 is respectively connected to both ends along the tire-widthwise direction H on the outer circumferential surface of the mounting body 11.

The dimension of the individual first connecting plates 21 and second connecting plates 22 in the tire-widthwise direction H (the direction of the axial line O), that is to say, the width is mutually equal. The respective thicknesses of the first connecting plates 21 and second connecting plates 22 are mutually equal. Each second end 21b, 22b of both connecting plates 21, 22 is connected to come into outer contact with the outer circumferential surface of the mounting body 11.

The annular body 12 is split into a plurality of split bodies 12a along the tire-circumferential direction. The split bodies 12a are formed from a metal material. The circumferential end edges of the split bodies 12a that are disposed adjacently along the tire-circumferential direction are in mutual close contact, or abut. Each first end 21a, 22a of both connecting plates 21, 22 in one connecting member 13 is connected over a plurality of split bodies 12a (three in the example in the figure) that is disposed adjacently along the tire-circumferential direction.

In the example in the figure, each first end 21a, 22a of both connecting plates 21, 22 in one connecting member 13 is connected at a position that is separated from a central portion in the tire-widthwise direction H toward the second end side (side opposite the vehicle) on the inner circumferential surface 12b of the annular body 12. Furthermore the dimension of the split bodies 12a in the tire-circumferential direction is substantially 1/10 of the dimension of the split bodies 12a in the tire-widthwise direction H.

A mounting member 19 is attached or bonded to the rear surface that configures the inner circumferential surface 12b of the annular body 12 in the plurality of split bodies 12a that is adjacently disposed along the tire-circumferential direction. The mounting member 19 is provided with a flat plate 19a and a block-shaped body 19b disposed in a central portion along the tire-circumferential direction in the front surface of the flat plate 19a. The plurality of split bodies 12a that is adjacently disposed along the tire-circumferential direction is connected by the mounting member 19.

The mounting member 19 is disposed on the back surface of the split bodies 12a at a position separated from the central portion in the tire-widthwise direction H to the other end. Each first end 21a, 22a of both connecting plates 21, 22 in one connecting member 13 is connected to come into outer contact with the front surface facing the inner side in the tire-radial direction on the block-shaped body 19b.

In the example shown in the figure, the dimension of the mounting body 11 in the tire-widthwise direction H is substantially half the dimension of the annular body 12 in the tire-widthwise direction H. In this manner, when the non-pneumatic tire 1 is attached to the vehicle with the first end in the tire-widthwise direction H positioned on the vehicle side and with the second end in the tire-widthwise direction H positioned on the opposite vehicle side, a space to accommodate a brake or the like is ensured in a portion that is positioned more toward the vehicle than the mounting body 11 on the inner side of the annular body 12 in the tire-radial direction.

In the present embodiment, each first end 21a, 22a of both connecting plates 21, 22 is connected through the block-shaped body 19b to a position corresponding to one of a plurality of circumferential main grooves 14a formed on the outer circumferential surface of the tread member 14 on the inner circumferential surface 12b of the annular body 12.

In the present embodiment, the first connecting plate 21 and the second connecting plate 22 are respectively formed for example from a metallic material or a resin material that has almost no hysteresis loss.

When the first connecting plate 21 and the second connecting plate 22 are formed from a metallic material such as steel, stainless steel or an aluminum alloy, or the like, both respective ends 21a, 21b, and 22a, 22b of the first connecting plate 21 and the second connecting plate 22 are welded or fixed and connected by a fixing member to the outer circumferential surface of the mounting body 11 and the block-shaped body 19b (the inner circumferential surface 12b side of the annular body 12).

When the first connecting plate 21 and the second connecting plate 22 are formed from a resin material, the respective ends 21a, 21b, and 22a, 22b of the first connecting plate 21 and the second connecting plate 22 are connected by adhering the resin material, or fixing with a fixing member to the outer circumferential surface of the mounting body 11 and the block-shaped body 19b (the inner circumferential surface 12b side of the annular body 12).

In the present embodiment, a resilient member 16 that is extended along the whole circumference of the tire-circumferential direction is provided in the annular body 12 and connects the plurality of split bodies 12a in the tire-circumferential direction. In the example shown in the figure, the resilient member 16 is a coil spring that is extended continuously along the whole circumference of the tire-circumferential direction, and is inserted into a plurality of supporting cylinders 16b that are disposed with an interval in the tire-circumferential direction in the annular body 12. The length of the supporting cylinders 16b along the tire-circumferential direction is slightly shorter than the length of the block-shaped bodies 19b along the tire-circumferential direction. The outer circumferential surface of the supporting cylinders 16b is adhered or bonded to the end surface of the second end in the tire-widthwise direction H on the block-shaped body 19b.

In the example shown in the figure, the number of supporting cylinders 16b coincides with the number of block-shaped bodies 19b, and one supporting cylinder 16b is disposed respectively for all of the block-shaped bodies 19b. The length of the portion positioned between adjacent supporting cylinders 16b along the tire-circumferential direction in the resilient member 16 is for example approximately 40 mm when no load is applied to the non-pneumatic tire 1. Furthermore the spring constant of the resilient member 16 is for example approximately 2.86 N/mm, and the outer diameter of the resilient member 16 is for example approximately 10.5 mm. The bending rigidity of the resilient member 16 may be greater than the bending rigidity in the tire-circumferential direction respectively of the first connecting plate 21 and the second connecting plate 22.

As described above, the mounting body 11 and the annular body 12 in the non-pneumatic tire 1 according to the present embodiment are configured by connecting with the plurality of connecting members 13 along the tire-circumferential direction, and do not have a solid inner structure filled with a rubber material. As a result, satisfactory ride quality and maneuverability can be secured by suppressing increase in weight, hardness and rolling resistance, and the occurrence of a puncture can be prevented.

In a side view of the tire, the connecting member 13 has first connecting plate 21 curved to protrude toward a first side in the tire-circumferential direction and second connecting plate 22 curved to protrude toward a second side. Consequently, when the mounting body 11 and the annular body 12 undergo relative displacement in the tire-radial direction, the tire-circumferential direction or the tire-widthwise direction H by an external force applied to the non-pneumatic tire 1, the first connecting plate 21 and the second connecting plate 22 can be easily and resiliently deformed in response to the displacement. As a result, flexibility can be imparted to the non-pneumatic tire 1, the transmission of vibrations to the vehicle can be suppressed, and satisfactory ride quality can be secured.

When each connecting member 13 displays line symmetry about the imaginary line L in the side view of the tire, a difference between a spring constant along a first side and the spring constant along the second side in the tire-circumferential direction in the non-pneumatic tire 1 can be suppressed. Therefore, since the difference between the spring constant in the direction of travel and the spring constant in a braking direction in the contact section of the tire 1 can be suppressed when the non-pneumatic tire 1 is contacted to the ground, satisfactory maneuverability can be ensured.

Since the annular body 12 is split into the plurality of split bodies 12a along a tire-circumferential direction, the flexibility of the annular body 12 is enhanced. Thus the annular body 12 as well as the first connecting plate 21 and the second connecting plate 22 can be deformed in response to an external force applied to the non-pneumatic tire 1. Therefore, it is possible to suppress a difference in contact pressure within the contact surface of the tire to further reliably secure satisfactory ride quality, and to prevent uneven wear on the tread member 14.

Since the annular body 12 is split into the plurality of split bodies 12a along a tire-circumferential direction, the formation of the non-pneumatic tire 1 is facilitated. Moreover, for example, when a part of the annular body 12 is damaged, only the damaged part can be exchanged without exchanging all of the annular body 12, and thereby maintenance characteristic can be improved.

Furthermore in the present embodiment, since the tread member 14 is disposed along the whole circumference on the outer circumferential side 12c of the annular body 12, the riding quality, the gripping characteristic and the durability of the non-pneumatic tire 1 can be improved.

Furthermore since the resilient member 16 that is extended along the tire-circumferential direction is provided in the annular body 12 and connects the plurality of split bodies 12a in the tire-circumferential direction, the amount of deformation of the annular body 12 can be regulated. As a result, an excessive increase in the flexibility of the annular body 12 by dividing the annular body 12 into a plurality of split bodies 12a can be suppressed.

Therefore it is possible to suppress a difference in contact pressure within the contact surface of the tire to the ground and suppress production of vibration. Moreover since the annular body 12 is split into a plurality of split bodies 12a, an increase in rolling resistance of the non-pneumatic tire 1 or an increase in the load applied to both connecting plates 21, 22 can be suppressed.

Of the above effects, since an increase in the load applied to both connecting plates 21, 22 can be suppressed, there is no requirement to increase durability of both connecting plates 21, 22 by increasing the bending rigidity so as to split the annular body 12 into a plurality of split bodies 12a. As a result, an increase in the weight of the connecting plates 21, 22 can be suppressed. Thus, it is possible to prevent an increase in the weight of the non-pneumatic tire 1 by dividing the annular body 12 into a plurality of split bodies 12a.

Furthermore since the plurality of split bodies 12a is connected in a tire-circumferential direction by the resilient member 16, and not by a rigid body, a large reduction in the contact surface area can be prevented. In addition, the durability of the non-pneumatic tire 1 can be improved since it is possible to prevent the formation of a section that applies a large localized load to the non-pneumatic tire 1 by dispersing the load from the road surface to a wide area of the non-pneumatic tire 1 through the resilient member 16.

In the present embodiment, since the resilient member 16 is a coil spring, the production of a hysteresis loss can be almost completely avoided, and rolling resistance can be reduced to less than a pneumatic tire.

Since each first end 21a, 22a of the both connecting plates 21, 22 is connected over the plurality of split bodies 12a that is mutually adjacent along the tire-circumferential direction, the provision of a sufficient number of split bodies 12a that configure the annular body 12 can be ensured to satisfy the above operation and effect. In addition, a contact pressure applied on the tread member 14 can be easily dispersed in the tire-circumferential direction, and a difference in the contact pressure within the contact surface can be suppressed.

The first ends 21a, 22a of the first connecting plate 21 and the second connecting plate 22 are connected through the block-shaped body 19b to a position corresponding to the circumferential main groove 14a formed on the outer circumferential surface of the tread member 14 on the inner circumferential surface 12b of the annular body 12. Consequently, when the non-pneumatic tire 1 makes ground contact, it is possible to respectively suppress a load applied to the whole of the connecting member 13 from the road surface, and a load applied to a corresponding portion that corresponds to each first end 21a, 22a of the first connecting plate 21 and the second connecting plate 22 in the tread member 14.

Of the above effects, since a load applied on a corresponding portion of the tread member 14 can be respectively suppressed, a localized increase in the contact pressure on the corresponding portion of the tread member 14 can be prevented, and it is possible to further suppress a difference in contact pressure within the contact surface.

Each first end 21a, 22a of both connecting plates 21, 22 in one connecting member 13 is respectively connected at mutually different positions in a tire-widthwise direction H at the same position in the tire-circumferential direction on the inner circumferential side 12b of the annular body 12. A plurality of connecting members 13 may be disposed along the tire-circumferential direction so that a plurality of first connecting plates 21 is disposed along the tire-circumferential direction at a first position in the tire-widthwise direction, and a plurality of second connecting plates 22 is disposed along the tire-circumferential direction at a second position in the tire-widthwise direction. Consequently interference between adjacent connecting members 13 along the tire-circumferential direction can be suppressed, and a limitation on the number of installed connecting members can be suppressed. In addition, dispersion of the contact pressure acting on the tread member 14 in the tire-widthwise direction H is further promoted, and uneven wear on the tread member 14 can be prevented.

Since the first connecting plate 21 and the second connecting plate 22 are respectively formed by a metal material or a resin material, the production of a hysteresis loss can be almost completely avoided, and a rolling resistance can be reduced to less than a pneumatic tire.

Although a second embodiment of a non-pneumatic tire according to the present invention will be described below making reference to FIG. 4 to FIG. 6B, those positions which are the same as the first embodiment are denoted by the same reference numerals, description will not be repeated, and only points of difference will be described.

Each first end 21a, 21a and second end 21b, 22b of both connecting plates 21, 22 in the non-pneumatic tire 2 is supported to rotate freely about a rotation axial line R that extends in parallel along the tire-widthwise direction H.

A plurality of first support protrusions 32 protruding toward the outside in the tire-radial direction is arranged at both tire-widthwise H ends on the outer circumferential face of the mounting body 31 at an equal interval in the tire-circumferential direction, and each of the first support protrusions 32 is provided with a first bearing hole 32a penetrating in the tire-widthwise direction H.

The first support protrusions 32 formed at both tire-widthwise H ends on the outer circumferential face of the mounting body 31 are opposed to each other in the tire-widthwise direction H, and the first bearing holes 32a formed in the first support protrusions 32 are positioned at the same axis as the rotation axial line R.

A mounting member 37 is provided with a flat plate 37a connected across the plurality of split bodies 12a, and a pair of second support protrusions 37b provided to protrude from the surface of the flat plate 37a at a distance from each other in the tire-widthwise direction H. The second support protrusion 37b is provided with a second bearing hole penetrating the tire-widthwise direction H. The second bearing holes are positioned at the same axis as the rotation axial line R.

In the present embodiment, each of the second ends 21b and 22b of both connecting plates 21 and 22 is provided with a first shaft portion 35 extending parallel to the tire-widthwise direction H, and both ends of the first shaft portion 35 protrude more toward the outside of the tire-widthwise direction H than the connecting plates 21 and 22. In the present embodiment, each of the first ends 21a and 22a of both connecting plates 21 and 22 is connected through a second shaft portion 36 extending in the tire-widthwise direction H. Both ends of the second shaft portion 36 protrude more toward the outside of the tire-widthwise direction H than both connecting plates 21 and 22.

Both ends of the first shaft portion 35 are rotatably inserted into the first bearing holes 32a, and both ends of the second shaft portion 36 are rotatably inserted into the second bearing holes.

In the present embodiment, a resilient member 38 that is extended along the whole circumference of the tire-circumferential direction is provided in the annular body 12 and connects the plurality of split bodies 12a in the tire-circumferential direction. In the example shown in the figure, the resilient member 38 is formed as a ring that has the same outer diameter as the inner diameter of the annular body 12. The outer circumferential surface of the resilient member 38 is adhered or bonded to the inner circumferential surface of the annular body 12. A flat plate 37a of the mounting member 37 is adhered or bonded to the inner circumferential surface of the resilient member 38. The resilient member 38 for example is formed by a metallic material, a vulcanized rubber prepared by vulcanizing natural rubber and/or a rubber composition, or a thermoplastic material, or the like. The metallic material includes aluminum or stainless steel, or the like. The thermoplastic material includes a thermoplastic elastomer or thermoplastic resin as described above. The bending rigidity of the resilient member 38 may be greater than the bending rigidity in the tire-circumferential direction respectively of the first connecting plate 21 and the second connecting plate 22. Furthermore the size of the resilient member 38 along the tire-widthwise direction H is the same as the size of the flat plate 37a along the tire-widthwise direction H.

As described above, each first end 21a, 21a and second end 21b, 22b of both connecting plates 21, 22 in the non-pneumatic tire 2 according to the present embodiment is supported to rotate freely about a rotation axial line R. Consequently, when an external force is applied to the non-pneumatic tire 2, the mounting body 31 and the annular body 12 undergo relative displacement in the tire-radial direction, the tire-circumferential direction, or the tire-widthwise direction H, and the connecting portion of both connecting plates 21, 22 rotate about the rotation axial line R to thereby suppress a large localized deformation in the connecting portion. Thus the whole of the connecting plates 21, 22 can deform uniformly without deviation to thereby suppress a load applied on the connecting portion. Therefore ride quality and the durability of the entire connecting member 13 can be further improved.

However when a configuration is used in which the connecting portion of both connecting plates 21, 22 rotate about the rotation axial line R, the number of connecting members 13 may be limited due to considerations of space. In this manner, when the number of connecting members 13 is limited, if each first end 21a, 22a of both connecting plates 21, 22 in one connecting member 13 is connected to one split body 12a, there will be an insufficient number of split bodies 12a, and the above operation and effect will not be enabled.

However when a configuration is adopted in which the connecting portion of both connecting plates 21, 22 is supported to freely rotation about the rotation axial line R, even if the number of connecting members 13 is reduced, as described above, when each first end 21a, 22a of both connecting plates 21, 22 in one connecting member 13 is connected across the plurality of split bodies 12a that is disposed adjacently along the tire-circumferential direction, the number of split bodies 12a that configure the annular body 12 is sufficient to maintain the above operation and effect. That is to say, a high number of split bodies 12a can be maintained without reference to the number of connecting members 13 by connecting each first end 21a, 22a of both connecting plates 21, 22 in one connecting member 13 across the plurality of split bodies 12a that is disposed adjacently along the tire-circumferential direction.

In the present embodiment, the resilient member 38 is formed as a ring that has the same outer diameter as the inner diameter of the annular body 12. Therefore when manufacturing the non-pneumatic tire 2, the position of disposition of the plurality of split bodies 12a can be specified using the single reference of the resilient member 38, and therefore the non-pneumatic tire 2 can be formed simply with high accuracy.

The technical scope of the present invention is not limited to the above embodiments, and various modifications can be made within a scope that does not depart from the spirit of the present invention.

Figure 7:
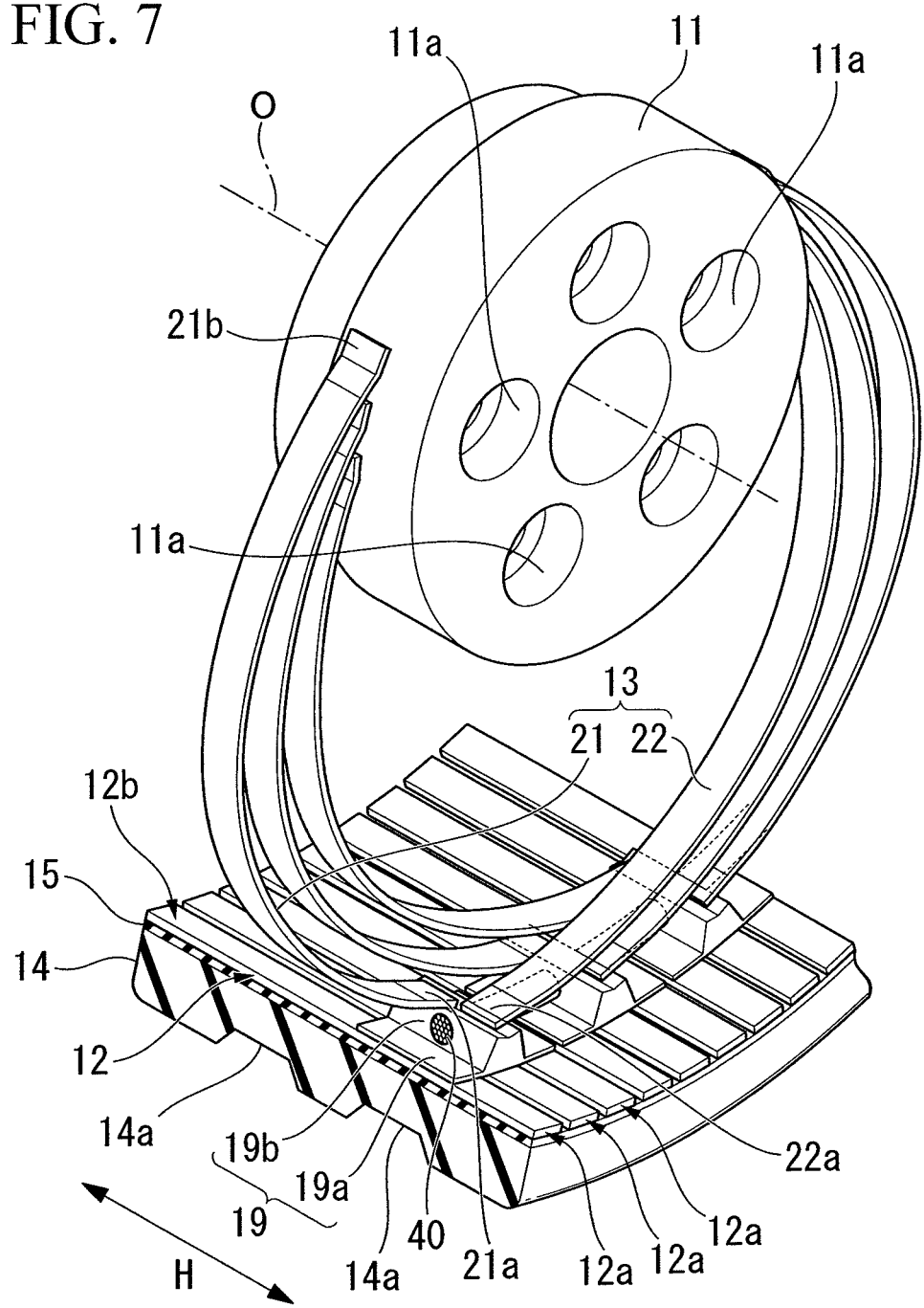
FIG. 7 is a schematic perspective view showing a part of the non-pneumatic tire according to another embodiment of the present invention.

For example, in substitution for the resilient member 16, 38 described in the embodiments above, as shown in FIG. 7, a ring-shaped wire bundle (resilient member) 40 formed from steel or the like may be used. The wire bundle 40 may be disposed in a through hole that penetrates the block-shaped body 19b in the tire-circumferential direction. As shown in the example in the figure, the wire bundle 40 is connected and extends across the entire circumference along the tire-circumferential direction. A single wire or a twisted line formed from steel for example may be used in substitution for the wire bundle 40. Furthermore the wire bundle 40, the single wire or the twisted line may be bonded or adhered to the inner circumferential surface 12b of the annular body 12, or the mounting member 19 without forming a through hole in the block-shaped body 19b.

The position of disposition of the resilient member 16, 38 as shown in each of the above embodiments is not limited to the position as depicted and may be any position that enables connection of a plurality of split bodies 12a in the annular body 12 in the tire-circumferential direction.

Although each of the resilient members 16, 38, 40 as described above is connected and extend across the entire circumference along the tire-circumferential direction, the members may be continuously interspersed or extend along the tire-circumferential direction. For example, the resilient members 16, 38, 40 can be extended across the whole circumference in the tire-circumferential direction, and a plurality of split bodies 12a may be connected across the whole circumference in the tire-circumferential direction with the resilient members 16, 38, 40 by splitting the resilient members 16, 38, 40 into a plurality of split bodies along the tire-circumferential direction, connecting the two split bodies 12a in the tire-circumferential direction by one resilient split body, and connecting two resilient split bodies are connected to one split body 12a. In this manner, the formation of the resilient members 16, 38, 40 can be easily formed, and the resilient members 16, 38, 40 can be simply assembled into the annular body 12.

In each of the above embodiments, one first connecting plate 21 and one second connecting plate 22 are provided as the connecting member 13. However instead, one connecting member 13 may be provided with a plurality of first connecting plates 21 and a plurality of second connecting plates 22 at positions different from each other in the tire-widthwise direction H.

The plurality of connecting members 13 may be arranged between the mounting body 11 and the annular body 12 along the tire-widthwise direction H.

Although disk-shaped body has been described as the mounting body 11 or 31, for example, a ring-shaped body or the like may be employed.

In each of the above embodiments, although the circumferential end edges of the split bodies 12a that are disposed adjacently along the tire-circumferential direction are in close contact or abutment, they may be separated with respect to the tire-circumferential direction. In this case, the flexibility of the non-pneumatic tire 1, 2 can be increased.

In this configuration, a gap may be disposed with reference to the resilient members 16, 38, 40 along the tire-circumferential direction between the portion disposed between the split bodies 12a that are disposed adjacently along the tire-circumferential direction and the inner circumferential surface of the tread member 14 (in the example shown in the figure, the inner circumferential surface of the reinforcing layer 15). In this case, a load from the road surface can be transmitted to both connecting plates 21, 22 to thereby enable the above operation and effect, and enables simple mounting of the tread member 14 or the reinforcing layer 15 on the outer circumferential surface 12c of the annular body 12.

The material forming the first connecting plate 21 and the second connecting plate 22 is not limited to the above embodiments, and may be suitably modified.

In contrast to the above embodiments, the second ends 21b, 22b of the first connecting plate 21 and the second connecting plate 22 may for example be connected respectively to an opposed position sandwiching the axial line O along the tire-radial direction on the outer circumferential surface of the mounting body 11, 31, alternatively, the second ends 21b, 22b may be connected respectively to an opposed position along the tire-radial direction at the first ends 21a, 22a of the first connecting plate 21 and the second connecting plate 22 on the outer circumferential surface of the mounting body 11, 31.

Furthermore in each embodiment above, the inner circumferential surface of the reinforcing member 15 is attached to an outer circumferential surface 12c of the annular body 12 through an adhesive agent or the like, and an outer circumferential surface is attached and fixed to an inner circumferential surface of the tread member 14. However in another aspect, a resilient return force of both contacting plates 21, 22 may be used to bring the outer circumferential surface 12c of the annular body 12 and the inner circumferential surface of the reinforcing member 15 into close contact, and bring the outer circumferential surface of the reinforcing member 15 and the inner circumferential surface of the tread member 14 into close contact. Furthermore the reinforcing member 15 may be omitted.

In each of the above embodiments, each first end 21a, 2a of both connecting plates 21, 22 in one connecting member 13 is connected across the plurality of split bodies 12a that is disposed adjacently along the tire-circumferential direction. However each first end 21a, 2a of both connecting plates 21, 22 in one connecting member 13 may be connected to one split body 12a.

Furthermore in the above embodiments, each first end 21a, 22a of both connecting plates 21, 22 is connected though the block-shaped body 19b to a position corresponding to one of the plurality of circumferential main grooves 14a formed on the outer circumferential surface of the tread member 14 on the inner circumferential surface 12b of the annular body 12. However the ends 21a, 22a may be connected to an arbitrary position on the inner circumferential surface 12b of the annular body 12.

In substitution of each of the above embodiments, each first end 21a, 22a of both connecting plates 21, 22 may be connected to a different circumferential position of the tire on the inner circumferential surface 12b of the annular body 12.

In each of the above embodiments, a configuration is described in which each first end 21a, 22a of both connecting plates 21, 22 is connected through the block-shaped body 19b to a position corresponding to the circumferential main grooves 14a formed on the outer circumferential surface of the tread member 14 on the inner circumferential surface 12b of the annular body 12. However in another aspect, a transverse groove (pattern groove) is formed on an outer circumferential surface of the tread member 14, and each first end 21a, 22a of both connecting plates 21, 22 may be connected to a position corresponding to the transverse groove on the inner circumferential surface 12b of the annular body 12.

Furthermore in the second embodiment, although a configuration is described in which both first ends 21a, 22a and second ends 22b, 22b of both connecting plates 21, 22 are supported to rotate freely about the rotation axial line R, at least one of the first ends 21a, 22a and second ends 22b, 22b may be supported to rotate freely about the rotation axial line R.

Figure 6A:
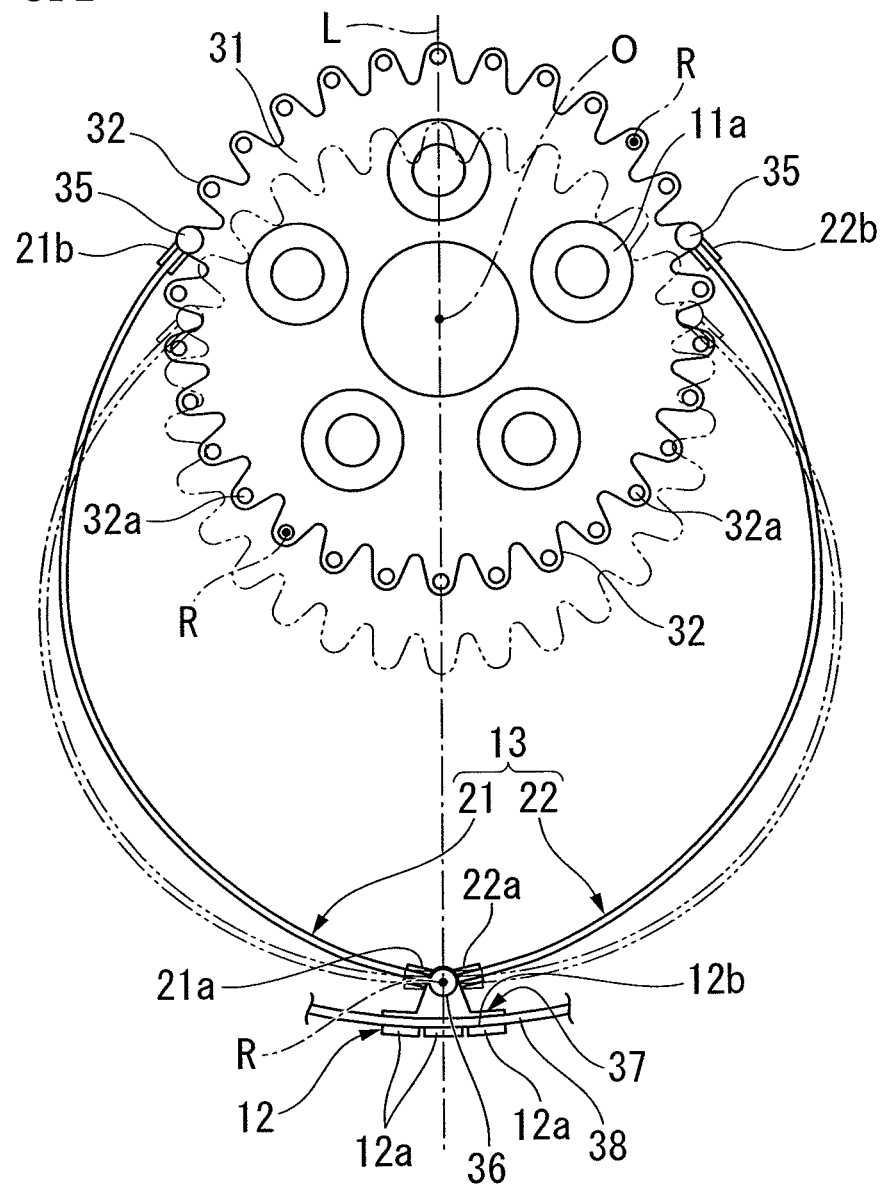
FIG. 6A is a front view of the connecting member and the mounting body seen from the tire-widthwise direction in the non-pneumatic tire in FIG. 4.
Figure 6B:
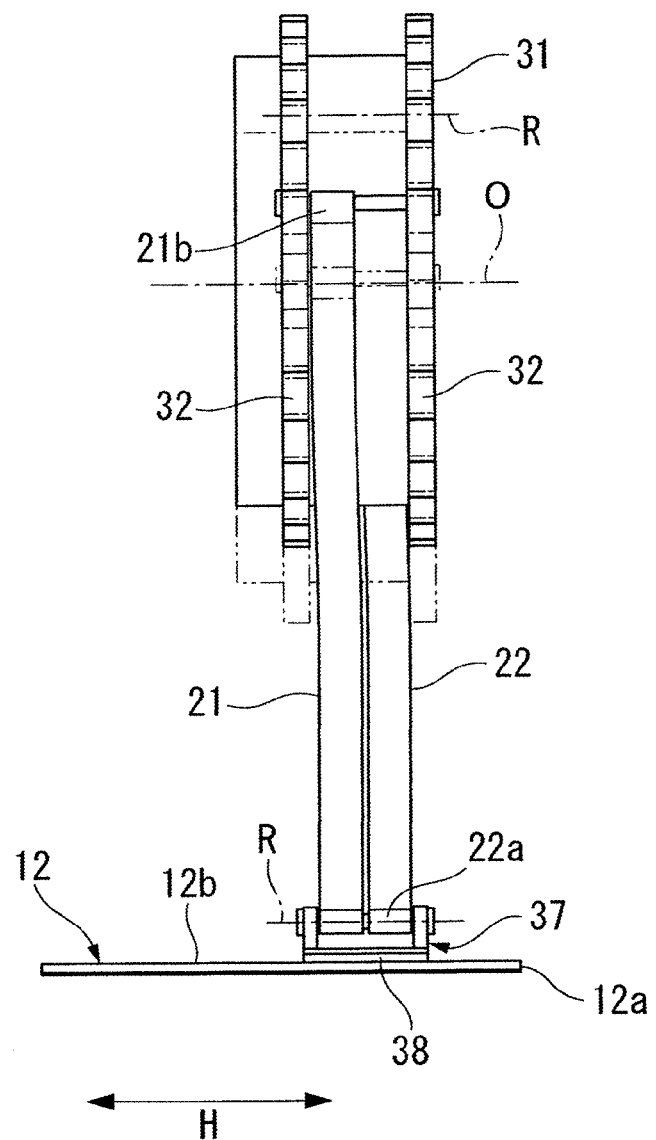
FIG. 6B is a side view of the front view shown in FIG. 6A.
Figure 8A:
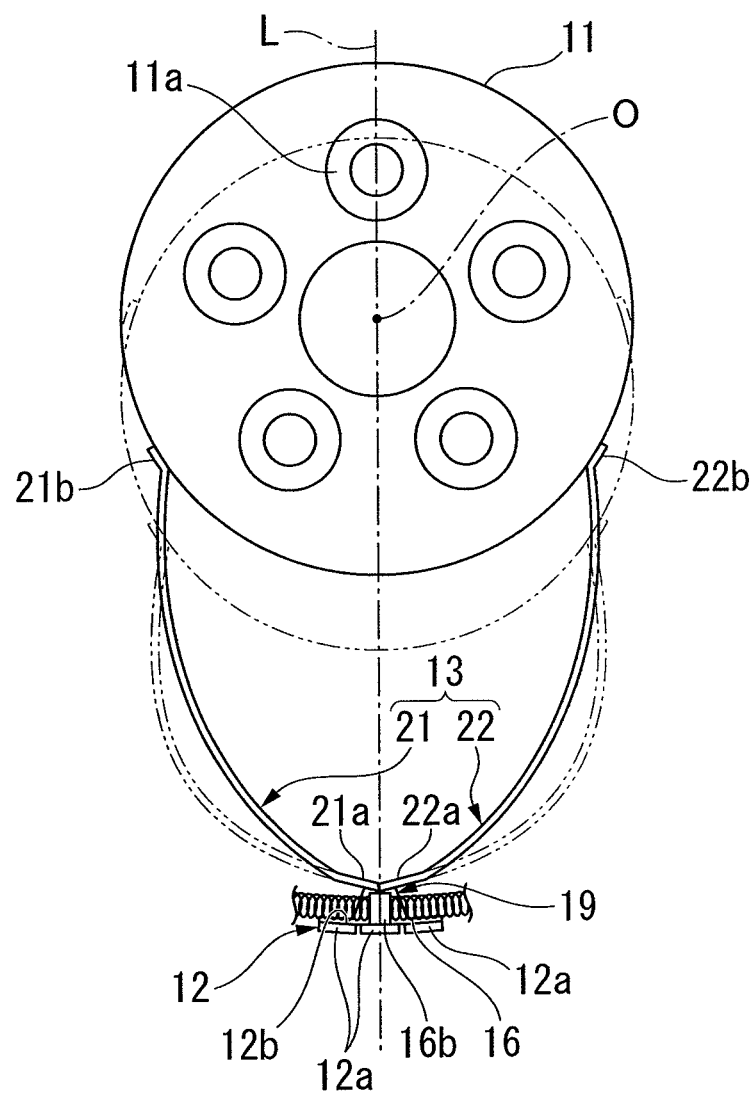
FIG. 8A is a front view of the connecting member and the mounting body seen from the tire-widthwise direction in the non-pneumatic tire shown as another embodiment of the present invention.

In each of the above embodiments, the second ends 21b, 22b of both connecting plates 21, 22 are respectively connected to positions separated by the same angle within a range of for example, at least 45° to 135° or less, and preferably, as shown in FIG. 3 and FIG. 6, at least 90° to 120° or less, to the first side and the second side in the tire-circumferential direction about the axial line O from a position in the tire-radial direction facing each first end 21a, 22a on the outer circumferential surface of the mounting body 11. In this manner, both connecting plates 21, 22 can easily deform in response to an input force, and thereby riding quality are improved. However, it is possible, for example, to maintain a plurality of connecting members 13, reduce the weight of the non-pneumatic tire 1, 2, and prevent interference between both connecting plates 21, 22 that are adjacently disposed along the tire-circumferential direction by connecting the second ends 21b, 22b of both connecting plates 21, 22 to respective positions separated by the same angle within a range of, for example, at least 20° to less than 90° as shown in FIG. 8 to the first side and the second side in the tire-circumferential direction about the axial line O from a position facing the outer circumferential surface of the mounting body 11, 31 when viewed from the side.

The tread member 14 may be omitted from the outer circumferential side 12c of the annular body 12.

Furthermore the shape when viewed from the side of the connecting member 13 may be asymmetrical with respect to the imaginary line L.

In addition, the constituent elements in each of the above embodiments may be substituted as required, and modifications may be suitably combined within a scope that does not depart from the spirit of the present invention.

Testing to verify the operation and effect as described above was performed as described hereafter.

Figure 2:
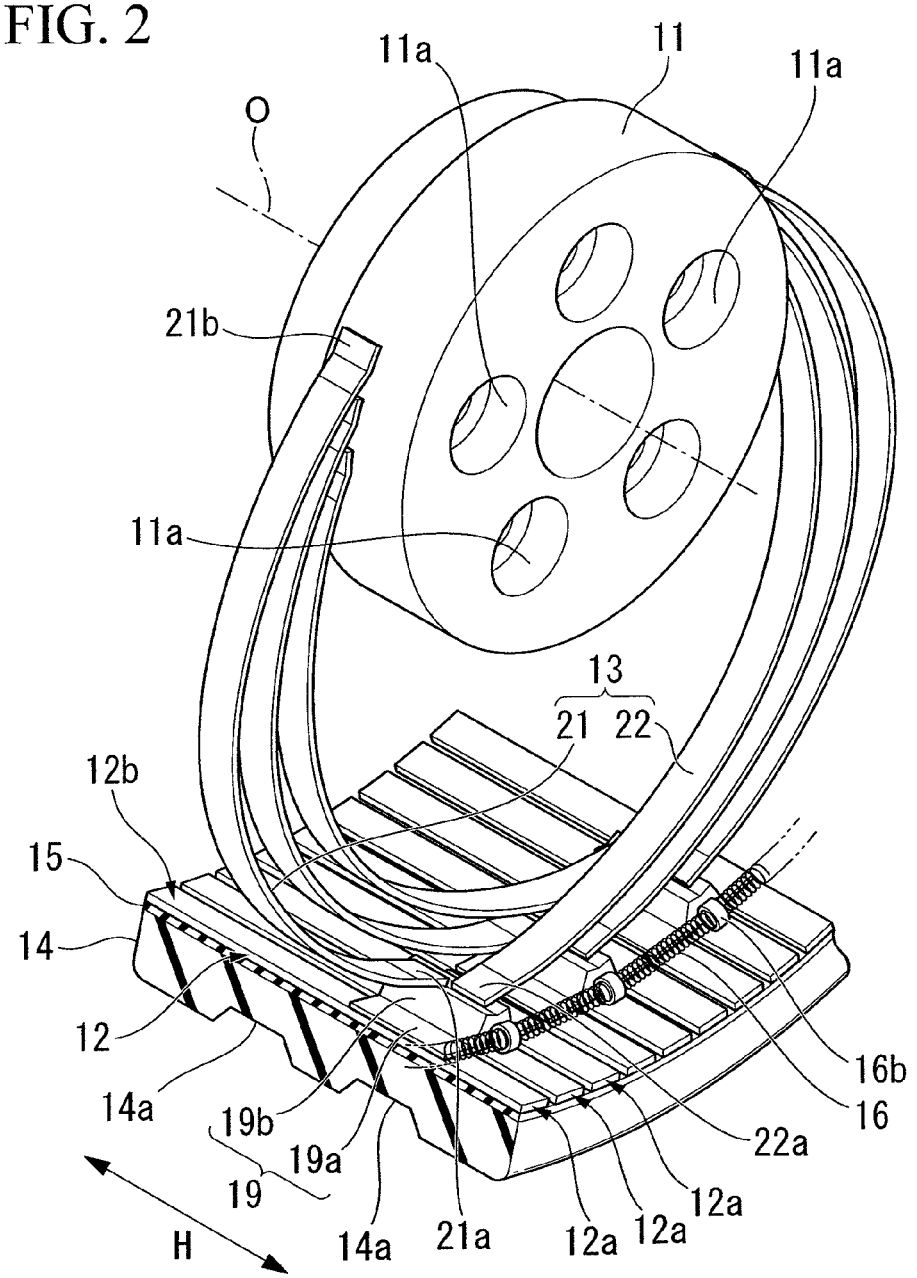
FIG. 2 is a schematic perspective view showing a part of the non-pneumatic tire in FIG. 1.
Figure 4:
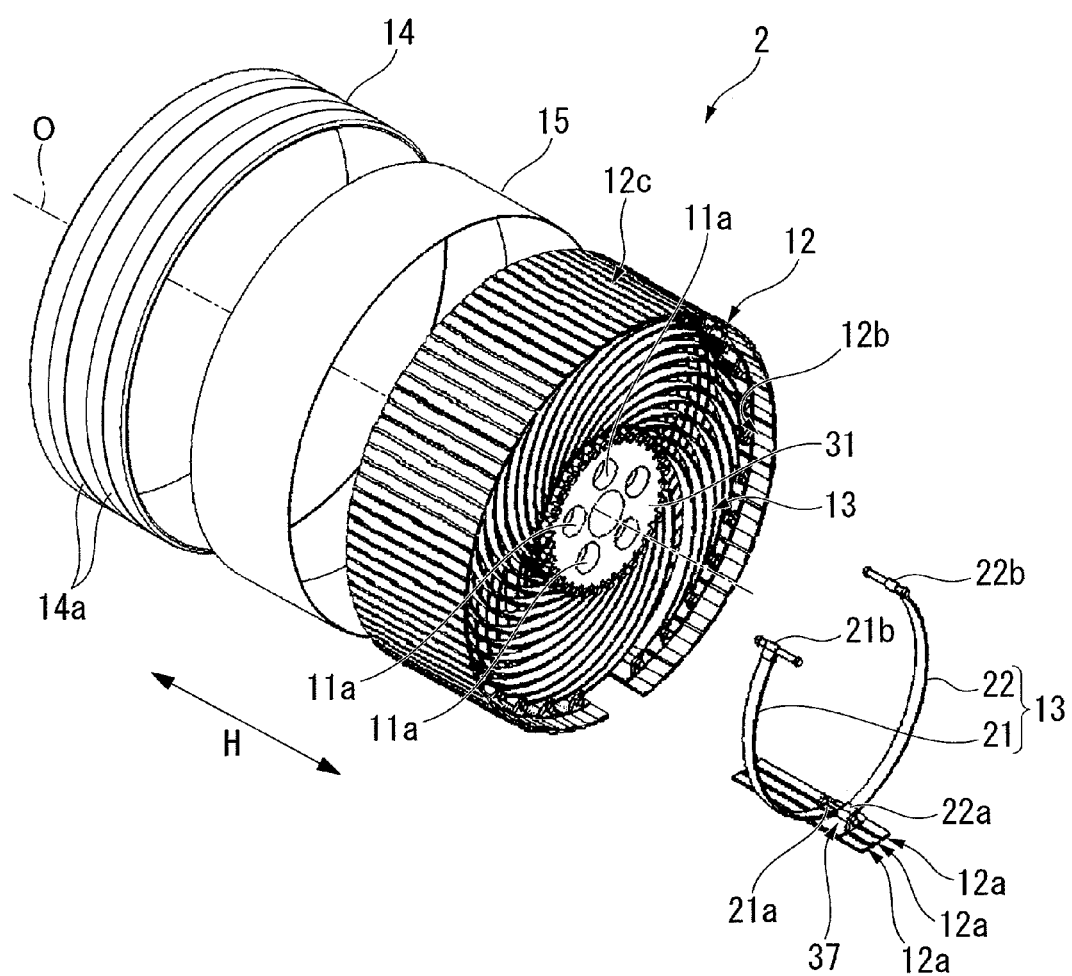
FIG. 4 is a schematic perspective view of disassembling a part of the non-pneumatic tire according to the second embodiment of the present invention.
Figure 5:
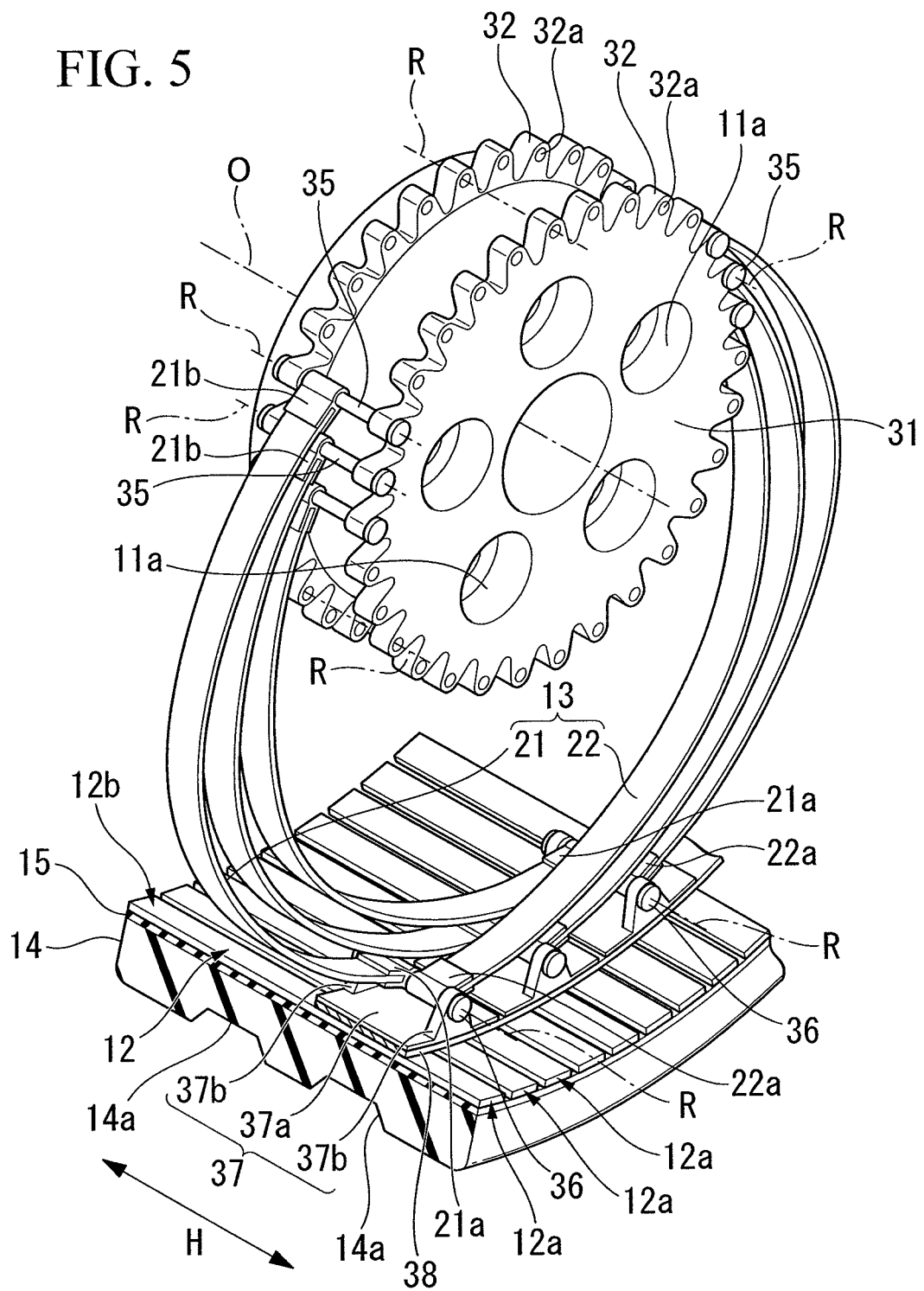
FIG. 5 is a schematic perspective view showing a part of the non-pneumatic tire in FIG. 4.

In a first working example, a non-pneumatic tire 1 as shown in FIG. 1 to FIG. 3 is used. In place of the resilient member 38 in the non-pneumatic tire 2 as shown in FIG. 4 to FIG. 6, a configuration using the resilient member 16 as shown in FIG. 1 and FIG. 2 is employed.

In a first comparative example, a configuration is employed in the non-pneumatic tire 1 according to the first working example in which the first ends 21a, 22a of both connecting plates 21, 22 in one connecting member 13 are connected to one split body that integrates three split bodies 12a. In a second comparative example, a configuration is employed in the non-pneumatic tire 2 according to the second working example in which the first ends 21a, 22a of both connecting plates 21, 22 in one connecting member 13 are connected to one split body that integrates three split bodies 12a. In a third comparative example, a configuration omitting the resilient member 16 is used in relation to the non-pneumatic tire according to the first working example.

In a conventional example, a pneumatic tire with an internal pressure of 230 kPa is used.

The size of the tire in all of the first working example, second working example, first comparative example, second comparative example, third comparative example, and conventional example is 195/55R16.

In the first working example, the size and thickness in the tire-widthwise direction H in both connecting plates 21, 22 is respectively 18 mm, and 3.0 mm, and the size and thickness in the tire-circumferential direction in the split bodies 12a of the annular body 12 is respectively 16 mm, and 3.5 mm.

In the second working example, the size and thickness in the tire-widthwise direction H in both connecting plates 21, 22 is respectively 18 mm, and 2.0 mm, and the size and thickness in the tire-circumferential direction in the split bodies 12a of the annular body 12 is respectively 16 mm, and 3.5 mm.

In all of the first working example, second working example, first comparative example, second comparative example, and third comparative example, both connecting plates 21, 22 are formed from stainless steel, and the annular body 12 is formed from an aluminum alloy.

Tests are performed using the conventional example as an evaluation standard (100) to thereby use indexes to evaluate the spring constant in the direction of travel, the spring constant in the direction of braking, the rolling resistance and the weight of the non-pneumatic tire 1 according to the first working example.

The rolling resistance is evaluated by measuring a rolling resistance force applied to a drum shaft when the tires respectively described above are rotated at a speed of 80 km/h and pressed with a force of 4.0 kN to a drum of the drum test device.

The spring constant is measured by applying a pressing the tires above with a force of 4.0 kN onto a rigid plate and measuring the force and the related displacement amount (tire deformation amount) when the rigid plate is pressed along the tire-circumferential direction in a direction orthogonal to the direction of pressing.

The results are shown in Table 1.

In the Table, values for weight, rolling resistance are superior when smaller, and values for spring constant are superior when larger.

TABLE 1

| | Weight | Rolling Resistance | Spring Constant in Direction of Travel | Spring Constant in Direction of Braking |
|---|---|---|---|---|
| Working Example 1 | 105 | 77 | 105 | 105 |
| Conventional Example | 100 | 100 | 100 | 100 |

The results confirm that the non-pneumatic tire 1 according to the first working example suppresses an increase in weight, and enables a reduction in the rolling resistance more than a conventional pneumatic tire by limiting the deformation amount of the annular body 12. Furthermore it is confirmed that an increase in the respective spring constants is suppressed, and a spring constant is enabled that is the equal to the pneumatic tire in the conventional example.

Using the first comparative example as an evaluation standard (100), the respective non-pneumatic tire in the first working example, the second working example, and the second comparative example are evaluated using indexes with respect to a standard deviation in the contact pressure, the riding quality, and durability.

The standard deviation in the contact pressure is evaluated by using image processing to measure the contact shape obtained by pressing each non-pneumatic tire in the first and second comparative example and the first and second working example with a force of 4.0 kN onto a flat plate through a pressure-sensitive paper.

Riding quality are evaluated by mounting the respective tires above onto a vehicle, mounting two persons into the vehicle and evaluating on the basis of the feeling of the driver when operating the vehicle.

Durability is evaluated using the time until a defect is produced by rotating each non-pneumatic tire in the first and second comparative example and the first and second working example at a speed of 81 km/h while pressing the tires with a force of 5.2 kN onto the drum of a drum testing device.

The results are shown in Table 2.

In the Table, values for standard deviation of contact pressure are superior when smaller, and values for riding quality and durability are superior when larger.

TABLE 2

| | Contact Pressure Standard Deviation | Riding Quality | Durability |
|---|---|---|---|
| Working Example 1 | 70 | 120 | 110 |
| Working Example 1 | 66 | 125 | 130 |
| Comparative Example 1 | 100 | 100 | 100 |
| Comparative Example 2 | 97 | 105 | 120 |

The results confirm that when the non-pneumatic tire 1 according to the first working example and the non-pneumatic tire according to the first comparative example are compared, and the non-pneumatic tire according to the second working example and the non-pneumatic tire according to the second comparative example are compared, the working examples enable a larger reduction in the contact pressure distribution than the comparative examples, and improve riding quality and durability more than the comparative examples.

Furthermore the non-pneumatic tire according to the second working example is confirmed to reduce the contact pressure distribution, and further improve riding quality and durability.

Using the third comparative example as a reference standard, the non-pneumatic tire 1 according to the first working example is evaluated using indexes with respect to the contact surface area, the standard deviation of the contact pressure, and the maximum stress applied to both connecting plates 21, 22.

The contact surface area and the standard deviation of the contact pressure are calculated using image processing of the contact shape obtained in the same manner as described above. The maximum stress is calculated using numerical analysis.

The results are shown in Table 3.

In the Table, values for contact surface area are superior when larger, values for the standard deviation of the contact pressure are superior when smaller, and values for maximum stress are superior when smaller.

TABLE 3

|  | Contact Surface Area | Standard Deviation in Contact Pressure | Maximum Stress |
| --- | --- | --- | --- |
| Working Example 1 | 97 | 90 | 90 |
| Comparative Example 3 | 100 | 100 | 100 |

The results confirm that the non-pneumatic tire 1 according to the first working example maintains an equal contact surface area, and enables a reduction in both the contact pressure distribution and the maximum stress applied to both connecting plates 21, 22 in comparison to the non-pneumatic tire according to the third comparative example.

INDUSTRIAL APPLICABILITY

The non-pneumatic tire above secures satisfactory ride quality, maneuverability and durability by suppressing increase in weight, hardness and rolling resistance, ensures uniform contact-pressure distribution, and prevents the occurrence of a puncture.

DESCRIPTION OF THE REFERENCE NUMERALS 1,2 NON-PNEUMATIC TIRE
11, 31 MOUNTING BODY
12 ANNULAR BODY
12a SPLIT BODY
12b ANNULAR BODY INNER CIRCUMFERENTIAL SURFACE
12c ANNULAR BODY OUTER CIRCUMFERENTIAL SURFACE
13 CONNECTING MEMBER
14 TREAD MEMBER
14a CIRCUMFERENTIAL MAIN GROOVE (PATTERN GROOVE)
16, 38, 40 RESILIENT MEMBER
21 FIRST CONNECTING PLATE
22 SECOND CONNECTING PLATE
21a, 22a FIRST END
21b, 22b SECOND END
H TIRE-WIDTHWISE DIRECTION
L IMAGINARY LINE
O AXIAL LINE
R ROTATION AXIAL LINE

The invention claimed is:

1. A non-pneumatic tire comprising a mounting body that is mounted on an axle, an annular body that encircles the mounting body from the outside in a tire-radial direction, and a plurality of connecting members that is disposed along a tire-circumferential direction and connects the mounting body and the annular body,
wherein in a side view of the tire in a direction of the axial line, the connecting member includes first connecting plate curved to protrude toward a first side in the tire-circumferential direction and second connecting plate curved to protrude toward a second side, and
the annular body is split into a plurality of split bodies along the tire-circumferential direction, edges of the plurality of split bodies which are disposed adjacent to each other are spaced apart from each other in the tire-circumferential direction, the plurality of split bodies do not directly contact each other, and a resilient member that is extended along the tire-circumferential direction is provided in the annular body and connects the plurality of split bodies in the tire-circumferential direction over spaces between the plurality of split bodies.

2. The non-pneumatic tire according to claim 1 wherein a tread member is installed along the whole circumference of the outer circumferential side of the annular body, a pattern groove is formed on the outer circumferential surface of the tread member, and each first end of the first connecting plate and the second connecting plate is connected to the position that corresponds to the pattern groove on the inner circumferential surface side of the annular body.

3. The non-pneumatic tire according to claim 1 wherein each first end of the first connecting plate and the second connecting plate in one connecting member is respectively connected at mutually different positions in a tire-widthwise direction and at the same position in the tire-circumferential direction on the inner circumferential side of the annular body, and
the plurality of connecting members is disposed along the tire-circumferential direction so that a plurality of first connecting plates is disposed along the tire-circumferential direction at a first position in the tire-widthwise direction, and so that a plurality of second connecting plates is disposed along the tire-circumferential direction at a second position in the tire-widthwise direction.

4. The non-pneumatic tire according to claim 2 wherein each first end of the first connecting plate and the second connecting plate in one connecting member is respectively connected at mutually different positions in a tire-widthwise direction and at the same position in the tire-circumferential direction on the inner circumferential side of the annular body, and
the plurality of connecting members is disposed along the tire-circumferential direction so that a plurality of first connecting plates is disposed along the tire-circumferential direction at a first position in the tire-widthwise direction, and so that a plurality of second connecting plates is disposed along the tire-circumferential direction at a second position in the tire-widthwise direction.

5. The non-pneumatic tire according to claim 1 wherein the first connecting plate and the second connecting plate are respectively formed by a metal material or a resin material.

6. The non-pneumatic tire according to claim 2 wherein the first connecting plate and the second connecting plate are respectively formed by a metal material or a resin material.

7. The non-pneumatic tire according to claim 3 wherein the first connecting plate and the second connecting plate are respectively formed by a metal material or a resin material.

8. The non-pneumatic tire according to claim 4 wherein the first connecting plate and the second connecting plate are respectively formed by a metal material or a resin material.

9. The non-pneumatic tire according to claim 1 wherein at least one of each first end of the first connecting plate and the second connecting plate connected to the inner circumferential side of the annular body and each second end of the first connecting plate and the second connecting plate connected to the outer circumferential side of the mounting body is supported to rotate freely about a rotation axial line that extends in parallel along the tire-widthwise direction.

* * * * *